US011809730B2

(12) United States Patent
Zhang et al.

(10) Patent No.: US 11,809,730 B2
(45) Date of Patent: Nov. 7, 2023

(54) STORAGE CONTROLLER AND DATA MIGRATION MONITORING METHOD

(71) Applicant: HUAWEI TECHNOLOGIES CO., LTD., Guangdong (CN)

(72) Inventors: Xianfu Zhang, Dongguan (CN); Zhengbo Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 17/389,461

(22) Filed: Jul. 30, 2021

(65) Prior Publication Data

US 2021/0357141 A1 Nov. 18, 2021

Related U.S. Application Data

(63) Continuation of application No. PCT/CN2019/074278, filed on Jan. 31, 2019.

(51) Int. Cl.
*G06F 12/00* (2006.01)
*G06F 3/06* (2006.01)
(52) U.S. Cl.
CPC .......... *G06F 3/0647* (2013.01); *G06F 3/0604* (2013.01); *G06F 3/0653* (2013.01); *G06F 3/0673* (2013.01)
(58) Field of Classification Search
CPC .... G06F 3/0647; G06F 3/0604; G06F 3/0653; G06F 3/0673
See application file for complete search history.

(56) References Cited

U.S. PATENT DOCUMENTS

| 6,895,485 | B1 | 5/2005 | Dekoning et al. |
| 9,848,042 | B1 | 12/2017 | Parkhurst |
| 10,459,662 | B1* | 10/2019 | Volpe .................. G06F 12/0246 |
| 2008/0086616 | A1 | 4/2008 | Asano et al. |
| 2017/0168720 | A1 | 6/2017 | Kazi et al. |

(Continued)

FOREIGN PATENT DOCUMENTS

| CN | 1624670 A | 6/2005 |
| CN | 104881443 A | 9/2015 |

(Continued)

OTHER PUBLICATIONS

AN5131, Using the Built-in Self-Test (BIST) on the MPC5777M, NXP Semiconductors, Application Note Rev. 1, Feb. 2019, 38 pages, https://www.nxp.com/docs/en/application-note/AN5131.pdf.

(Continued)

*Primary Examiner* — John A Lane

(57) ABSTRACT

A storage controller is coupled to a memory, and the memory includes a first storage area and a second storage area. The storage controller includes a data migration circuit and a data operation determining circuit. The data migration circuit is configured to generate a migration signal, to migrate data in the first storage area to the second storage area. In a process in which the data migration circuit migrates all the data in the first storage area to the second storage area, the data operation determining circuit is configured to: receive and monitor a data operation signal input to the memory, and output a data migration failure signal when detecting that the data operation signal is a data modify signal with respect to the first storage area.

20 Claims, 3 Drawing Sheets

(56) References Cited

U.S. PATENT DOCUMENTS

2019/0079790 A1* 3/2019 Tagashira ............ G06F 9/45558
2022/0226860 A1* 7/2022 Witzigreuter ....... B05C 17/0113

FOREIGN PATENT DOCUMENTS

| CN | 105093526 A | 11/2015 |
| CN | 107741811 A | 2/2018 |
| CN | 108008915 A | 5/2018 |

OTHER PUBLICATIONS

Extended European Search Report issued in EP19913613.6, dated Dec. 10, 2021, 7 pages.
Notice of Allowance issued in CN201980089806.3, dated Jun. 1, 2023, 4 pages.

* cited by examiner

STORAGE CONTROLLER AND DATA MIGRATION MONITORING METHOD

CROSS-REFERENCE TO RELATED APPLICATIONS

This application is a continuation of International Application No. PCT/CN2019/074278, filed on Jan. 31, 2019, the disclosure of which is hereby incorporated by reference in its entirety.

TECHNICAL FIELD

This application relates to the field of electronic technologies, and in particular, to a storage controller and a data migration monitoring method.

BACKGROUND

In recent years, with development of computer technologies and electronic device manufacturing processes, various kinds of computer systems are constantly emerging. A memory is an indispensable key component of a computer system and therefore people pose higher requirements on memory availability and reliability. In actual application, the memory is prone to a permanent or temporary failure caused by interference of ambient pressure (for example, a very high ambient temperature of the memory) and peripheral pressure (for example, poor contact of a peripheral circuit of the memory). How to detect a memory failure in a short time and deal with the failure in time has become one of current research hotspots. In the conventional technology, a real-time monitoring technology in which a normal operating state of the memory is not interrupted is usually used to monitor the memory, to detect a failure of the memory in time. In actual application, the real-time monitoring technology relates to memory data migration, for example, memory data backup and restoration. During data migration, atomicity of a migration operation needs to be ensured. In other words, migrated data needs to be consistent before and after the migration. If the migrated data is rewritten during the migration, the data needs to be migrated again. However, in an existing data migration method, a case in which migrated data is rewritten cannot be detected in time. Consequently, many invalid data operations caused by a data migration failure occur during data migration, and the existing data migration method has low efficiency, low accuracy, and poor applicability.

SUMMARY

Embodiments of this application provide a storage controller and a data migration monitoring method, to improve efficiency, accuracy, and applicability of the data migration method.

According to a first aspect, an embodiment of this application provides a storage controller. The storage controller is coupled to a memory. The storage controller includes a data migration circuit and a data operation determining circuit. An end of the data migration circuit is connected to one end of the memory, and another end of the data migration circuit is connected to an end of the data operation determining circuit. Another end of the data operation determining circuit is connected to the other end of the memory. The memory includes a first storage area and a second storage area. The data migration circuit is configured to generate a migration signal, and the migration signal is used to migrate data in the first storage area to the second storage area. In a data migration process in which the data migration circuit migrates all the data in the first storage area to the second storage area, the data operation determining circuit is configured to receive and monitor a data operation signal input to the memory, and output a data migration failure signal when detecting that the data operation signal is a data modify signal for the first storage area.

In this embodiment, in the process in which the data migration circuit migrates the data in the first storage area of the memory to the second storage area of the memory, the data operation determining circuit monitors, in real time, the data operation signal input to the memory, to determine, in time, a case in which the data migration fails. Therefore, a quantity of invalid data migration operations caused by the data migration failure can be reduced, and efficiency, accuracy, and applicability of the data migration method based on the storage controller are improved.

With reference to the first aspect, in a first example implementation, the data operation determining circuit is further configured to output a data migration success signal when the data modify signal for the first storage area is not detected in the data migration process.

With reference to the first example implementation of the first aspect, in a second example implementation, the storage controller further includes an address switching circuit. The address switching circuit is configured to: after the data migration success signal is detected, switch a data storage address of the first storage area, to which the data operation signal points, to a corresponding storage address in the second storage area. After it is determined that the data migration succeeds, address switching is performed using the address switching circuit, so that a data processing delay caused using software to perform address switching can be avoided, and efficiency of the data migration method based on the storage controller is improved. In addition, it can be ensured that a data operation with respect to the first storage area can be correctly performed after the data migration is completed.

With reference to any one of the first aspect or the first example implementation and the second example implementation of the first aspect, in a third example implementation, the data operation determining circuit includes an address determining circuit and an operation type determining circuit. Herein, the address determining circuit is configured to receive and extract the data storage address to which the data operation signal points, and determine whether the data storage address is the storage address of the first storage area. The operation type determining circuit is configured to: when detecting that the address determining circuit determines that the data storage address is the storage address of the first storage area, extract a data operation type corresponding to the data operation signal. The operation type determining circuit is further configured to: when the data operation type is data rewrite, determine that the data operation signal is the data modify signal for the first storage area, and output the data migration failure signal. The data operation determining circuit finally determines, using the data storage address to which the data operation signal points and the operation type corresponding to the data operation signal, whether the data operation signal is the data rewrite operation for the first storage area. The process is simple, easy to implement, and accuracy of a determined result of the data operation determining circuit can be ensured.

With reference to the third example implementation of the first aspect, in a fourth example implementation, the operation type determining circuit is configured to: when detecting that the data operation signal is the data modify signal for the first storage area, if a response success signal corresponding to the data operation signal is received, output the data migration failure signal. Herein, the response success signal is used to indicate that data at the data storage address to which the data operation signal points is rewritten. The operation type determining circuit outputs the data migration failure signal only when determining that the data rewrite operation is successfully performed, so that incorrect determining of a migration result caused by a failure of performing the data rewrite operation requested by the data operation signal can be avoided. In this way, a quantity of invalid operations caused by the incorrect determining of the migration result can be reduced, and efficiency and accuracy of the data migration method can be improved.

With reference to the third example implementation or the fourth example implementation of the first aspect, in a fifth example implementation, the operation type determining circuit is further configured to: when determining that the data operation signal is the data modify signal for the first storage area, trigger the data migration circuit to record the data storage address to which the data operation signal points. The data migration circuit is further configured to: after all the data in the first storage area is migrated to the second storage area, remigrate, from the first storage area to the second storage area, the data at the data storage address to which the data operation signal points. Specifically, the data migration circuit records the data storage address at which the data rewrite operation exists, continues to perform the data migration operation until all the data in the first storage area is migrated to the second storage area, and performs the data migration operation again on the data at the data storage address at which the data rewrite operation exists, so that the data migration circuit does not need to repeatedly perform the data migration operation on data at a data storage address at which no data rewrite operation exists, to improve efficiency of the data migration method.

With reference to the third example implementation or the fourth example implementation of the first aspect, in a sixth example implementation, the data operation determining circuit is further configured to: when determining that the data operation signal includes the data modify signal for the first storage area, trigger the data migration circuit to stop data migration. When the data modify signal for the first storage area is detected, the data migration circuit is triggered to stop the data migration operation. In this way, a quantity of invalid data migration operations performed by the data migration circuit can be reduced, and efficiency of the data migration method is improved.

With reference to any one of the first aspect or the first example implementation to the sixth example implementation of the first aspect, in a seventh example implementation, if the operation type determining circuit detects that the data operation signal includes the data modify signal for the first storage area, after the data migration circuit migrates all the data in the first storage area to the second storage area, the data migration circuit is triggered to stop the data migration, and output the migration failure signal at an output end of the monitoring circuit.

With reference to any one of the first aspect or the first example implementation to the seventh example implementation of the first aspect, in an eighth example implementation, the data migration circuit may generate the migration signal after detecting a data migration start signal. Herein, the data migration start signal indicates the storage address of the first storage area and a storage address of the second storage area.

According to a second aspect, an embodiment of this application provides a data migration monitoring method. A data operation for a memory is monitored in a process of migrating all data in a first storage area of the memory to a second storage area of the memory. When it is detected that the data operation is a data rewrite operation for the first storage area, it is determined that data migration fails.

In this embodiment of this application, the data operation for the memory is monitored in real time, so that a data migration failure caused by the data rewrite operation for the first storage area may be determined accurately and in time, and a quantity of invalid data operations caused by the data migration failure can be reduced. In this way, efficiency, accuracy, and applicability of a data migration process according to the data migration monitoring method can be improved.

With reference to the second aspect, in a first example implementation, if all the data in the first storage area is migrated to the second storage area, and no rewrite operation for the first storage area is detected, it is determined that the data migration succeeds.

With reference to the first example implementation of the second aspect, in a second example implementation, when it is determined that the data migration succeeds, a data storage address of the first storage area, to which the data operation with respect to the first storage area points, is switched to a corresponding storage address in the second storage area. Because a result of successful data migration is found in time, address switching is immediately performed after it is determined that the data migration succeeds. In this way, efficiency of the data migration process can be further improved. In addition, it can be ensured that a data operation with respect to the first storage area can be correctly performed after the data migration is completed.

With reference to the second aspect or any one of the first example implementation and the second example implementation of the second aspect, in a third example implementation, when it is determined that the data storage address to which the data operation points is the storage address of the first storage area, a data operation type corresponding to the data operation is obtained. If the data operation type corresponding to the data operation is data rewrite, it may be determined that the data operation is the data rewrite operation for the first storage area. It is determined, using the data storage address to which the data operation points and the operation type corresponding to the data operation, whether the data operation for the memory is the rewrite operation for the first storage area, to ensure validity of the foregoing determined result. In addition, the method is easy to implement, and helps improve efficiency of the data migration method.

With reference to the second aspect or any one of the first example implementation to the third example implementation of the second aspect, in a fourth example implementation, if it is determined that the data rewrite operation for the first storage area is successfully performed, it is determined that the data migration fails. When it is detected that there is a data rewrite operation for the first storage area and it is determined that the rewrite succeeds, it is determined that the data migration fails, so that incorrect determining caused by an unsuccessful execution of the data rewrite operation can be avoided, and accuracy of the data migration monitoring method is improved.

With reference to the second aspect or any one of the first example implementation to the fourth example implementation of the second aspect, in a fifth example implementation, when it is determined that the data migration fails, the data migration may be stopped. After it is determined that the migration fails, the current data migration is immediately stopped. Therefore, a quantity of invalid data migration operations can be reduced, and data migration efficiency can be improved.

With reference to any one of the second aspect or the first example implementation to the fifth example implementation of the second aspect, in a sixth example implementation, when the data operation is the data rewrite operation for the first storage area, the data storage address to which the data operation points is recorded. After all the data in the first storage area is migrated to the second storage area, the data at the storage address to which the data operation points is remigrated from the first storage area to the second storage area. The data migration operation is performed again on the data storage address to which the first data operation points. Specifically, the data storage address at which the data rewrite operation exists is recorded, and after all the data in the first storage area is migrated to the second storage area, the data migration operation is performed again on the data storage address at which the data rewrite operation exists, so as to avoid repeatedly performing the data migration operation on a data storage address at which no data rewrite operation exists. This improves efficiency of the data migration method.

With reference to the second aspect or any one of the first example implementation to the sixth example implementation of the second aspect, in a seventh example implementation, when it is determined that the data migration fails, after all the data in the first storage area is migrated to the second storage area, the data migration operation is stopped.

With reference to any one of the first example implementation to the sixth example implementation of the second aspect, in the seventh example implementation, when it is determined that the migration fails or the migration succeeds, a current migration status is reported as a migration failure state or a migration success state. The current data migration status is actively reported as the failure state or the success state, so that a result of data migration failure or data migration success can be learned in time. In this way, subsequent occurrence of more invalid data operations for the memory can be avoided, and a response speed of the memory can be improved. Therefore, efficiency of the data migration method is improved.

According to a third aspect, an embodiment of this application provides an electronic device. The electronic device includes a processor and a memory, and the processor and the memory are interconnected. The memory is configured to store a computer program, the computer program includes program instructions, and the processor is configured to invoke the program instructions to perform the data migration monitoring method of the memory provided in the second aspect and implement beneficial effects of the data migration monitoring method of the memory provided in the second aspect.

According to a fourth aspect, an embodiment of this application provides a computer-readable storage medium. The computer-readable storage medium stores instructions, and when the instructions are run on a computer, the computer is enabled to perform the data migration monitoring method of the memory provided in any example implementation of the second aspect and implement beneficial effects of the data migration monitoring method of the memory provided in the second aspect.

According to a fifth aspect, an embodiment of this application provides a computer program product including instructions. When the computer program product is run on a computer, the computer is enabled to perform the data migration monitoring method of the memory provided in the second aspect and implement beneficial effects of the data migration monitoring method of the memory provided in the second aspect.

According to a sixth aspect, an embodiment of this application provides a chip system. The chip system includes a processor, configured to implement the functions in the second aspect, for example, generate or process information in the data migration monitoring method of the memory provided in the second aspect. In an example embodiment, the chip system further includes a memory, and the memory is configured to store program instructions and data that are necessary for a terminal. The chip system may include a chip, or may include a chip and another discrete component.

Based on the implementations provided in the foregoing aspects, this application may be further combined to provide more implementations.

According to the embodiments of this application, efficiency, accuracy, and applicability of the data migration method can be improved.

BRIEF DESCRIPTION OF DRAWINGS

To describe the technical solutions in embodiments of this application or in the conventional technology more clearly, the following briefly describes the accompanying drawings for describing the embodiments or the conventional technology.

DESCRIPTION OF EMBODIMENTS

The following clearly describes the technical solutions in the embodiments of this application with reference to the accompanying drawings in the embodiments of this application.

In the embodiments of this application, for example, "first" and "second" in a first storage area of a memory and a second storage area of the memory are only used to distinguish different storage areas, and have no other limiting function. It may be understood that when the memory is an independent storage component, the first storage area and the second storage area are a part of storage space in the memory. A storage address of the first storage area or the second storage area is a segment of storage address corresponding to the storage space. When the memory includes a plurality of independent storage particles, the first storage area and the second storage area are different storage particles in the memory. In this case, a storage address of the first storage area or the second storage area is a segment of storage address corresponding to a storage particle. In the embodiments of this application, a scenario in which the first storage area is a storage area from which data is migrated, the second storage area is a storage area to which data is migrated, and the memory is the independent storage device is used as an example for description.

Embodiment 1

Figure 1:
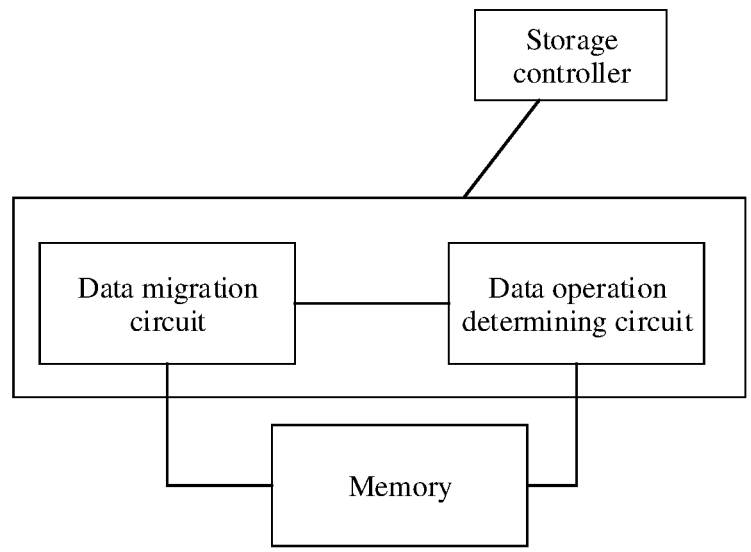
FIG. 1 is a schematic structural diagram of a storage controller according to an embodiment of this application.

FIG. 1 is a schematic structural diagram of a storage controller according to an embodiment of this application. It can be learned from FIG. 1 that the storage controller is coupled to a memory. It should be noted that the memory and the storage controller in this embodiment of this application may be integrated into two mutually coupled chips, or both the memory and the storage controller may be integrated into a same memory chip. This is not limited herein.

The storage controller may include a data migration circuit and a data operation determining circuit. The memory includes a first storage area and a second storage area. The data migration circuit is configured to generate a migration signal, to migrate data in the first storage area to the second storage area. In a data migration process in which the data migration circuit migrates all the data in the first storage area to the second storage area, the data operation determining circuit is configured to receive and monitor a data operation signal that is input to the memory, and output a data migration failure signal when detecting that the data operation signal is a data modify signal for the first storage area.

Figure 2:
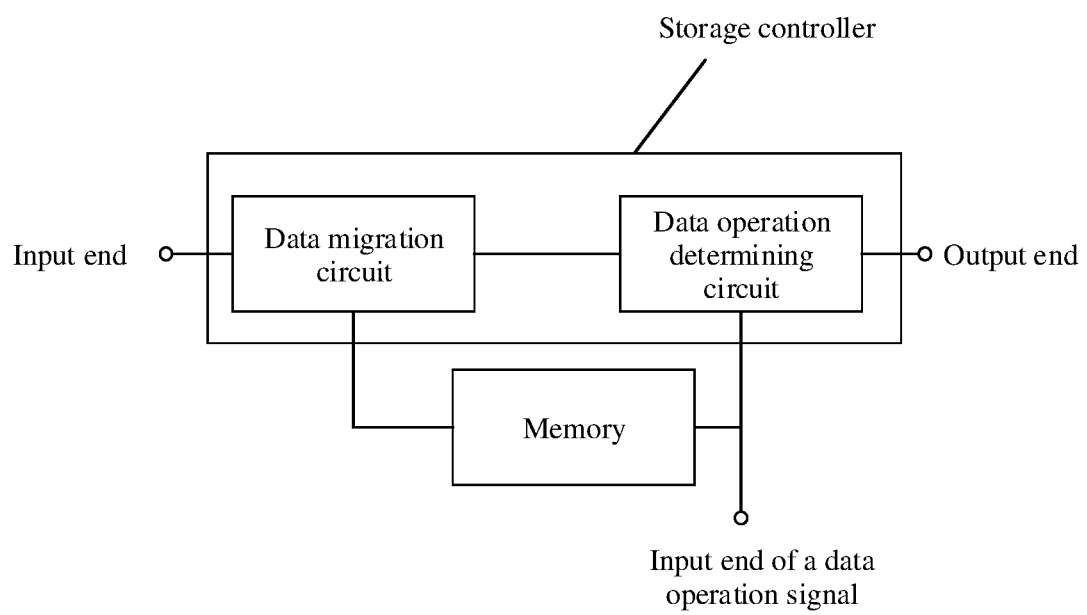
FIG. 2 is another schematic structural diagram of a storage controller according to an embodiment of this application.

FIG. 2 is another non-limiting, exemplary schematic structural diagram of a storage controller according to an embodiment of this application. It can be learned from FIG. 2 that an end of the data migration circuit is used as an input end of the storage controller. Another end of the data migration circuit is connected to one end of the memory. Still another end of the data migration circuit is connected to an end of the data operation determining circuit. The other end of the memory is connected to another end of the data operation determining circuit and receives a data operation signal for the memory. Still another end of the data operation determining circuit is connected to an output end of the monitoring circuit.

In specific implementation, after detecting a data migration start signal at the end of the data migration circuit (that is, the input end of the storage controller), the data migration circuit may parse the data migration start signal, to extract a storage address of an area from which data is migrated (that is, the first storage area) and a storage address of an area to which data is migrated (that is, the second storage area). Then, the data migration circuit determines to start a data migration operation, and generates one or more migration signals, to migrate data in each storage unit in the first storage area to a corresponding storage unit in the second storage area. Herein, one migration signal is used to migrate data in one storage unit in the first storage area to a corresponding storage unit in the second storage area. The first storage area and the second storage area have a same size, and storage units included in the first storage area are in a one-to-one correspondence with storage units included in the second storage area. For example, it is assumed that the first storage area includes five storage units, and storage addresses of the five storage units are an address 1, an address 2, an address 3, an address 4, and an address 5 respectively. The five storage units store data a1, a2, a3, a4, and a5 respectively. The second storage area also includes five storage units, and addresses of the five storage units are an address 6, an address 7, an address 8, an address 9, and an address 10 respectively. After detecting the data migration start signal, the data migration circuit may generate one migration signal (for ease of differentiation, a first migration signal is used in the following for description). The data a1 stored in the storage unit corresponding to the address 1 is migrated to the storage unit corresponding to the address 6. After receiving an execution success signal of the first migration signal, the data migration circuit may generate a new migration signal (a second migration signal is used for description herein), to migrate the data a2 stored in the storage unit corresponding to the address 2 to the storage unit corresponding to the address 7. By analogy, after the data migration circuit generates five migration signals and successfully executes all the five migration signals, the data migration circuit may complete the data migration operation of migrating all the data in the first storage area to the second storage area.

When detecting that the data migration circuit determines to start the data migration operation, the data operation determining circuit may receive the data operation signal that is input to the memory at a data operation signal input end, and monitor the data operation signal in real time, to determine whether the data operation signal that is input to the memory includes the data modify signal for the first storage area. When detecting that the data operation signal that is input to the memory includes the data modify signal for a first memory, the data operation determining circuit may output the data migration failure signal at the output end of the monitoring circuit (that is, an output end of the data operation determining circuit). It should be noted that, after detecting the data migration failure signal, the data migration circuit may perform the data migration operation for the first storage area again when a fixed period arrives, until a data migration success signal is detected. The data operation signal is a data operation signal that is input to the memory at a moment in the data migration process.

Figure 3:
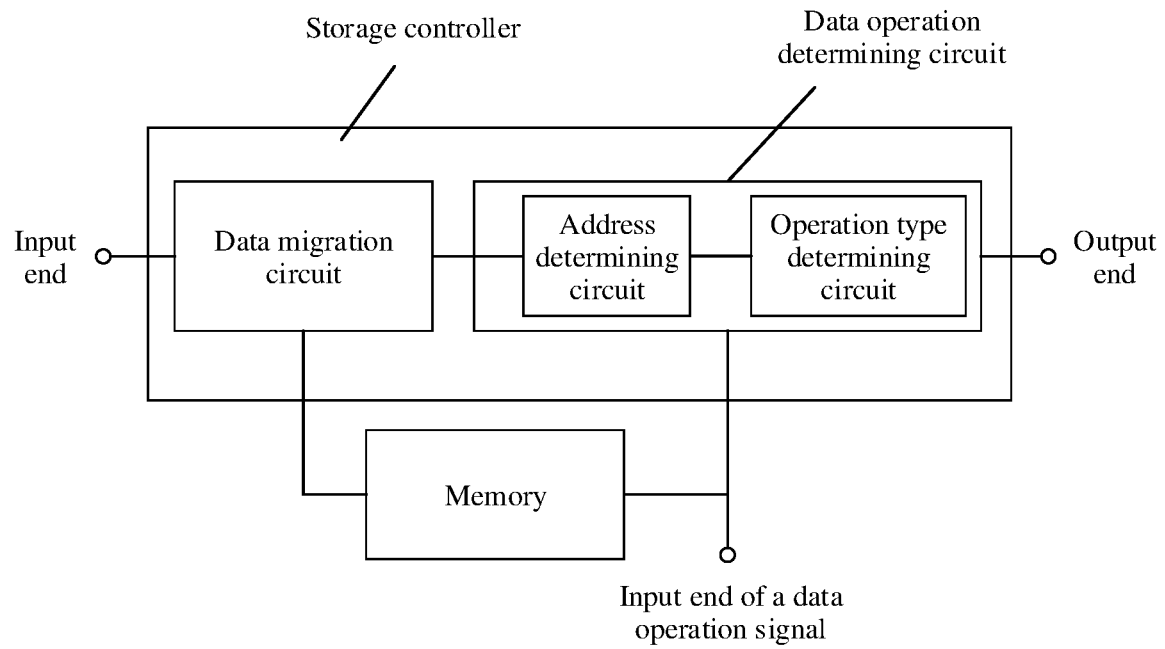
FIG. 3 is still another schematic structural diagram of a storage controller according to an embodiment of this application.

FIG. 3 is still another non-limiting, exemplary schematic structural diagram of a storage controller according to an embodiment of this application. It can be learned from FIG. 3 that the data operation determining circuit includes an address determining circuit and an operation type determining circuit. One end of the address determining circuit is used as one end of the data operation determining circuit, and the other end of the address determining circuit is connected to one end of the operation type determining circuit. The other end of the operation type determining circuit is used as an output end of the data operation determining circuit (also an output end of the memory). The data operation signal may be a data packet that includes three types of information: data operation instruction information, a storage address to which the data operation signal points, and a data operation type. After receiving the data operation signal, the address determining circuit may first parse the data operation signal, to obtain the data storage address to which the data operation signal points. Then, the address determining circuit may determine whether the data storage address to which the data operation signal points is included in the storage address of the first storage area, and transmit, to the operation type determining circuit, an address determining signal used to indicate a determined result. If the operation type determining circuit determines, based on the address determining signal, that the data storage address to which the data operation signal points is included in the storage address of the first storage area, the operation type determining circuit may extract a data operation type corresponding to the data operation signal from the data operation signal. If the operation type determining circuit detects that the data operation type corresponding to the data operation signal is data rewrite, the operation type determining circuit may output the data migration failure signal. If the address determining circuit detects that the data storage address to which the data operation signal points is not included in the storage address of the first storage area, or the operation type determining circuit detects that the data operation type corresponding to the data operation signal is not a data rewrite operation, the operation type determining circuit may not output a signal temporarily or may output an indication signal used to indicate that the data operation signal is not the data modify signal for the first storage area. Then, the address determining circuit may obtain a new data operation signal and repeat the determining operation. In this embodiment, whether the data operation is the data rewrite operation for the first storage area is finally determined using the data storage address to which the data operation signal points and the operation type corresponding to the data operation signal. This process is simple and easy to implement, and can ensure accuracy of a determined result.

Optionally, when the operation type determining circuit detects that the data operation type corresponding to the data operation signal is data rewrite, the operation type determining circuit may continue to monitor whether the data rewrite operation indicated by the first data operation signal is successfully performed. Specifically, after determining that the data operation signal is the data modify signal for the first storage area, the data operation determining circuit may trigger the memory to feed back a response signal corresponding to the data operation signal to the data operation determining circuit. When detecting that the response signal is a response success signal, the operation type determining circuit may determine that the data rewrite operation is successfully performed, and the data migration failure signal may be output at the output end of the monitoring circuit. When detecting that the response signal is a response failure signal, the operation type determining circuit may determine that the data rewrite operation fails to be performed, and the data migration failure signal does not need to be output. The data operation determining circuit outputs the data migration failure signal only when determining that the data rewrite operation is successfully performed, so that incorrect determining caused by a data rewrite failure can be avoided, and efficiency and accuracy of the data migration method can be improved.

Optionally, when detecting that the operation type corresponding to the data operation signal is data rewrite (in other words, the data operation signal is the data modify signal for the first storage area), the operation type determining circuit may send a recording trigger signal to the data migration circuit, to trigger the data migration circuit to record the data storage address to which the data operation signal points. Then, after the data migration circuit migrates all the data in the first storage area to the second storage area, the data migration circuit may perform the data migration operation on data again at the data storage address indicated by the operation signal. Herein, it should be noted that there may be a plurality of data modify signals for the first storage area in an entire data migration process. After detecting the data modify signals, the operation type determining circuit triggers the data migration circuit to record a plurality of data storage addresses to which the data modify signals point, and perform the data migration operation again on data at the plurality of data storage addresses after the current data migration operation is completed. Optionally, when there are a plurality of data modify signals for the first storage area, after completing the current data migration operation, the data migration circuit may first determine a quantity of data storage addresses, to which the data modify signals that are for the first storage area and that are recorded by the data migration circuit point. When the quantity is less than or equal to a preset quantity threshold, the data migration circuit may perform data migration again on the data at the data storage addresses. When the quantity is greater than the preset quantity threshold, the data migration circuit may perform the data migration operation again on all the data in the first storage area. The data migration circuit records a data storage address at which the data rewrite operation exists, and after migrating all the data in the first storage area to the second storage area, performs the data migration operation again on the data at the data storage address at which the data rewrite operation exists. In this way, the data migration circuit does not need to repeatedly perform the data migration operation on data at a data storage address at which no data rewrite operation exists, to improve efficiency of the data migration process.

Optionally, when detecting that the data operation signal is the data modify signal for the first storage area, the operation type determining circuit may send a data migration stop signal to the data migration circuit using an end that is of the operation type determining circuit and that is connected to the data migration circuit, to trigger the data migration circuit to stop data migration. For example, with reference to the foregoing data migration example, when the data migration circuit migrates the data a3 from the first storage area to the second storage area, if the operation type determining circuit detects the data modify signal for the first storage area, the operation type determining circuit may send the data migration stop signal to the data migration circuit, to trigger the data migration circuit to stop the data migration operation. In this way, the data migration circuit does not continue to perform the data migration operation on the data a4 and a5. Therefore, a quantity of invalid data migration operations can be reduced, and migration efficiency of the data migration method based on the storage controller can be improved.

Optionally, when the operation type determining circuit detects that the operation type corresponding to the data operation signal is data rewrite, after the data migration circuit migrates all the data in the first storage area to the second storage area, the operation type determining circuit sends a data migration stop signal to the data migration circuit using an end connected to the data migration circuit, to trigger the data migration circuit to stop migrating data in the first storage area to the second storage area.

In some example implementations, if the data migration circuit migrates all the data in the first storage area to the second storage area, and the data operation determining circuit does not detect that the data operation signal input to the memory includes the data rewrite operation signal for the first storage area, the data operation determining circuit outputs the data migration success signal at an output end of the monitoring circuit. After detecting the data migration success signal, the data migration circuit may stop the data migration operation for the first storage area.

Figure 4:
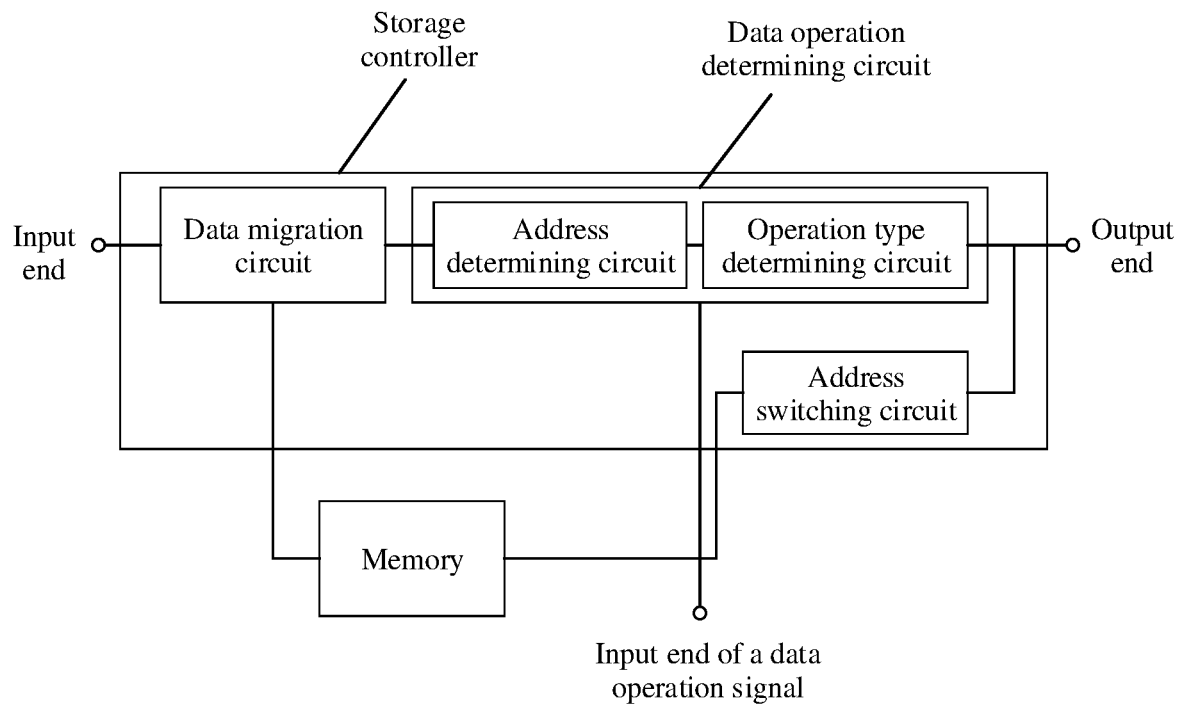
FIG. 4 is still another schematic structural diagram of a storage controller according to an embodiment of this application.

FIG. 4 is still another non-limiting, exemplary schematic structural diagram of a storage controller according to an embodiment of this application. It can be learned from FIG.

4 that the storage controller further includes an address switching circuit. One end of the address switching circuit is connected to the output end of the data operation determining circuit, and the other end of the address switching circuit is connected to one end of the memory. After the output end of the data operation determining circuit outputs the data migration success signal, the address switching circuit immediately switches a data storage address of the first storage area, to which a data operation signal with respect to the first storage area currently points, to a corresponding storage address in the second storage area. In addition, after the data migration is completed and before the data migration circuit restores data in the second storage area to the first storage area, as long as the data operation signal input to the memory includes the data operation signal with respect to the first storage area, the address switching circuit may switch the data storage address, to which the data operation signal with respect to the first storage area points, from the first storage area to the second storage area. In this way, after the data migration succeeds, one or more data operation instructions for the first storage area can accurately obtain, from the second storage area, data that needs to be operated by the one or more data operation instructions. After it is determined that the data migration succeeds, address switching is performed using the address switching circuit, so that a delay caused using software to perform address switching can be avoided, and efficiency of the data migration method based on the storage controller is improved.

It should be noted that, in actual application, the storage controller described in this embodiment of this application may be applied to an implementation scenario in which a memory has a high performance requirement. For example, a memory in user equipment (such as a mobile phone or a tablet computer), a network device (such as a base station server), or a core network device (such as a core router or a core server) has a relatively high performance requirement. The storage controller described in this embodiment of this application may perform access control on memories in these devices.

In this embodiment of this application, in a process in which the data migration circuit migrates the data in the first storage area of the memory to the second storage area of the memory, the data operation determining circuit monitors, in real time, the data operation signal input into the memory, to detect, in time, a case in which the data migration fails. Therefore, a quantity of invalid data migration operations caused by a data migration failure is reduced, and efficiency, accuracy, and applicability of the data migration method are improved.

Embodiment 2

Figure 5:
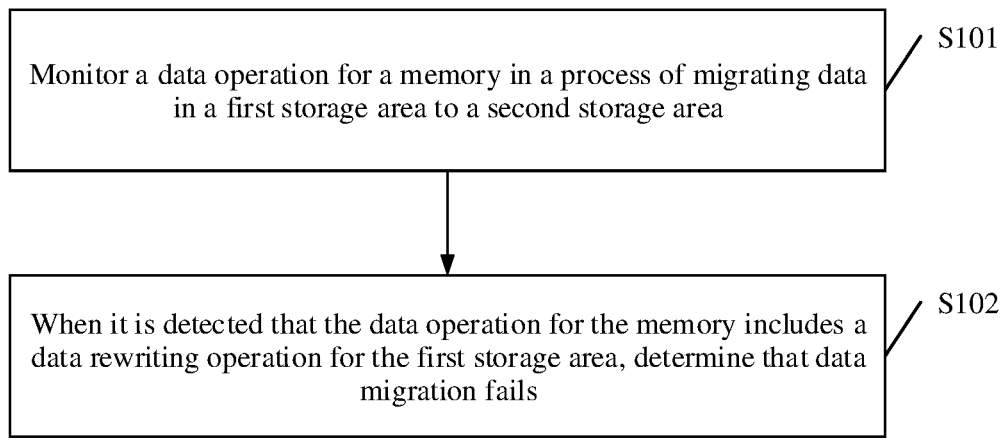
FIG. 5 is a schematic flowchart of a data migration monitoring method according to an embodiment of this application.

FIG. 5 is a schematic flowchart of a data migration monitoring method according to an embodiment of this application. The data migration monitoring method is applicable to a data migration process of a memory. In this embodiment, the memory includes a first storage area and a second storage area. The data migration monitoring method provided in this embodiment may be implemented by a monitoring device including the storage controller described in Embodiment 1. For ease of understanding, this embodiment is described using the monitoring device as an execution body. It should be noted that, in this embodiment, one-time complete data migration operation starts from starting the data migration operation by the monitoring device and ends with determining whether data migration succeeds or fails by the monitoring device. A data operation for the memory described in this embodiment is an operation instruction that can be received by the memory at any moment and that is used to request to process data in the memory. The monitoring method includes the following steps.

S101: Monitor a data operation for a memory in a process of migrating data in a first storage area to a second storage area.

In some example implementations, in a process of migrating all the data in the first storage area to the second storage area, a monitoring device may monitor the data operation for the memory at a data aggregation node of the memory. Herein, the data aggregation node of the memory may be a storage controller of the memory. The data operation for the memory is an operation used to implement processing such as reading, writing, and reading-clearing on data stored in the memory.

Optionally, in specific implementation, the monitoring device may first obtain a data migration start instruction, and start, according to the data migration start instruction, a data migration operation of migrating the data in the first storage area to the second storage area. Herein, the data migration start instruction indicates at least a storage address of the first storage area and a storage address of the second storage area. The first storage area and the second storage area have a same size, and storage units included in the first storage area are in a one-to-one correspondence with storage units included in the second storage area. For example, it is assumed that the data migration start instruction indicates that the first storage area includes five storage units, and storage addresses of the five storage units are an address 1, an address 2, an address 3, an address 4, and an address 5 respectively. The five storage units store data a1, a2, a3, a4, and a5 respectively. The second storage area also includes five storage units, and addresses of the five storage units are an address 6, an address 7, an address 8, an address 9, and an address 10 respectively. After obtaining the data migration start instruction, the monitoring device may send a first migration instruction to the storage controller, to instruct the storage controller to migrate the data a1 stored in the storage unit corresponding to the address 1 to the storage unit corresponding to the address 6. Then, the monitoring device may continue to send a second migration instruction, to instruct the storage controller to migrate the data a2 stored in the storage unit corresponding to the address 2 to the storage unit corresponding to the address 7. By analogy, after migrating all the data in the first storage area to the second storage area, the monitoring device stops sending a migration instruction.

When performing the data migration operation, the monitoring device may monitor the data operation for the memory in real time, to determine whether the data operation for the memory is a rewrite operation for the first storage area. Specifically, in the data migration process, the monitoring device may intercept, at the data convergence node of the memory at a moment, an operation instruction for requesting to perform a data operation on the memory. Then, the monitoring device may parse and determine the operation instruction, to further determine whether the data operation that is for the memory and that is requested by the operation instruction is the rewrite operation for the first storage area.

The following uses an operation instruction A for requesting to perform the data operation (for ease of understanding and differentiation, a first data operation is used in the following for description) on the memory as an example to describe a process in which the monitoring device determines whether the data operation for the memory is the rewrite operation for the first storage area. After intercepting the operation instruction A at a moment t1, the monitoring device may parse a data storage address to which the first data operation requested by the operation instruction A points, and determine whether the data storage address to which the first data operation points is included in the storage address of the first storage area. If the monitoring device determines that the data storage address to which the first data operation points is not included in the storage address of the first storage area, the monitoring device may continue to intercept a new data operation instruction, and repeatedly perform the foregoing determining process on the new operation instruction. If the monitoring device determines that the data storage address to which the first data operation points is included in the storage address of the first storage area, the monitoring device may extract a data operation type corresponding to the first data operation. For example, the monitoring device may parse the operation instruction A to obtain an operation type identifier corresponding to the target data operation, and then determine, based on the operation type identifier, the data operation type corresponding to the target data operation. Herein, the data operation type may include a read operation, a write operation, a read-clear operation, and the like. This is not limited herein. After determining the data operation type of the first data operation, the monitoring device may determine whether the data operation type is data rewrite. Herein, the data rewrite is a data operation that can cause a change to data in the first storage area, for example, the write operation or the read-clear operation. If the monitoring device determines that the data operation type corresponding to the first data operation is data rewrite, the monitoring device may determine that the first data operation is the rewrite operation for the first storage area. In other words, the data operation for the memory is the data rewrite operation for the first storage area. If the monitoring device determines that the first data operation is not a rewrite operation, the monitoring device may repeatedly perform the foregoing determining process according to a new operation instruction, and finally determine whether the data rewrite operation for the first storage area exists in the data migration process.

In this embodiment, whether the data operation for the memory is the rewrite operation for the first storage area is determined using the data storage address to which the data operation points and the operation type corresponding to the data operation, to ensure validity of the foregoing determined result. In addition, the method is easy to implement, and helps improve efficiency of the data migration method.

S102: When it is detected that the data operation for the memory is the rewrite operation for the first storage area, determine that data migration fails.

In some example implementations, after migration is completed, if data after the migration is inconsistent with data before the migration, it indicates that an error occurs in this data migration. Therefore, when the monitoring device determines that the data operation that is for the memory and that is intercept by the monitoring device is the rewrite operation for the first storage area, it indicates that the data in the first storage area may be changed in the data migration process. In this case, after all the data in the first storage area is migrated to the second storage area, the data in the first storage area may be different from the data in the second storage area. Therefore, the monitoring device may determine that the current data migration fails. For example, with reference to the example of the data migration process in step S101, if the monitoring device detects that a data operation instruction B is received when the monitoring device migrates a3 in the storage unit corresponding to the address 3 to the storage unit corresponding to the address 8, and the data operation instruction B requests to write data b2 into the storage unit corresponding to the address 2, after the current data migration is completed, the data stored in the first storage area is a1, b2, a3, a4, and a5, and the data stored in the second storage area is a1, a2, a3, a4, and a5. The data stored in the two storage areas is inconsistent. Therefore, when detecting the data operation instruction B, the monitoring device may determine that the current data migration fails.

Optionally, when detecting that the data operation for the memory is the rewrite operation for the first storage area, the monitoring device may continue to determine whether the rewrite operation is successfully performed. For example, the monitoring device may determine whether data at a storage address to which the rewrite operation points is changed after the rewrite operation is completed. If the data at the storage address to which the rewrite operation points is changed after the rewrite operation is completed, the rewrite operation is successfully performed. If the data at the storage address to which the rewrite operation points is not changed after the rewrite operation is completed, the rewrite operation fails to be performed. If the monitoring device determines that the rewrite operation for the first storage area is successfully performed, the monitoring device may determine that the data migration fails. If the monitoring device determines that the rewrite operation for the first storage area fails, the monitoring device continues to monitor the data operation for the memory. When it is detected that there is the data rewrite operation for the first storage area and it is determined that the data rewrite operation succeeds, it is determined that the data migration fails. This can avoid incorrect determining caused by a data rewrite failure, and improve accuracy of the data migration monitoring method.

Optionally, when detecting that the data operation for the memory is the rewrite operation for the first storage area, the monitoring device may record the data storage address to which the data operation points. Then, after migrating all the data in the first storage area to the second storage area, the monitoring device may perform the data migration operation again on data at the storage address to which the data operation points. Herein, it should be noted that there may be a plurality of data rewrite operations for the first storage area in an entire data migration process. After detecting the data rewrite operations, the monitoring device records a plurality of data storage addresses to which the data rewrite operations point, and performs the data migration operation again on data at the plurality of data storage addresses after the current data migration operation is completed. Optionally, when there are the plurality of data rewrite operations for the first storage area, after completing the current data migration operation, the monitoring device may first determine a quantity of data storage addresses to which the data rewrite operations that are for the first storage area and that are recorded by the monitoring device point. When determining that the quantity is less than or equal to a preset quantity threshold, the monitoring device may perform the data migration again on data at the storage addresses. When determining that the quantity is greater than a preset quantity threshold, the monitoring device may perform the data migration operation again on all the data in the first storage area. Specifically, the data storage address at which the data rewrite operation exists is recorded, and after all the data in the first storage area is migrated to the second storage area, the data migration operation is performed again on the data storage address at which the data rewrite operation exists. In this way, the monitoring device does not need to repeatedly perform the data migration operation on a data storage address at which no data rewrite operation exists, to improve efficiency of the data migration process.

Optionally, when the monitoring device determines that the migration fails, the monitoring device may stop the current data migration operation. For example, with reference to the foregoing data migration example, when the monitoring device migrates the data a3 from the first storage area to the second storage area, if it is detected that a rewrite operation is performed for the first storage area, the monitoring device may stop the data migration operation. That is, the migration operation on the data a4 and a5 is not performed. In this way, a quantity of invalid data migration operations can be reduced, and data migration efficiency can be improved. Optionally, when determining that the data migration fails, the monitoring device may not immediately stop the data migration operation. The monitoring device stops the data migration operation after migrating all the data in the first storage area to the second storage area.

Optionally, after determining that the migration fails, the monitoring device may actively report that a current status of data migration is a failure state. In this way, another component connected to the monitoring device can detect, in time, that the current data migration fails, to avoid more invalid operations, improve data migration efficiency, and improve resource utilization in the data migration process. Alternatively, after determining that the migration succeeds, the monitoring device may actively report that a current data migration status is a success state. In this way, another component connected to the monitoring device can detect, in time, that the current data migration succeeds, so as to quickly respond, and improve efficiency of the data migration process.

Optionally, when determining that the current data migration fails, the monitoring device may start a preset timer for timing. When an accumulated time of the timer is equal to a preset time threshold, the monitoring device resets the timer, and restarts a second data migration operation.

In some example implementations, if all the data in the first storage area is migrated to the second storage area, and no rewrite operation for the first storage area is detected, the monitoring device may determine that the data migration succeeds. For example, with reference to the foregoing data migration example, until the monitoring device migrates the data a1, a2, a3, a4, and a5 from the first storage area to the second storage area, the monitoring device detects no data rewrite operation for the first storage area, or the monitoring device detects that no data rewrite operation for the first storage area is successfully performed. In this way, the monitoring device may determine that the current data migration succeeds.

Optionally, when determining that the data migration succeeds, the monitoring device may switch the data storage address of the first storage area, to which the data operation with respect to the first storage area points, to a corresponding storage address in the second storage area. It should be noted herein that the data operation with respect to the first storage area described herein is a data operation that is requested by a data operation instruction for the first storage area and that is detected by the monitoring device at any time in the data migration process and after the data migration succeeds. In this way, after the data migration succeeds, the data operation can accurately indicate, from the second storage area, data that needs to be operated. When determining that data migration succeeds, the monitoring device immediately performs address mapping in the storage area, to reduce an operation delay caused by enabling address mapping based on a data migration state. In this way, data migration efficiency is improved, and it is ensured that a correct response can be obtained to the data operation with respect to the first storage area after the data migration succeeds.

In some example implementations, when determining that the current data migration succeeds, the monitoring device may immediately stop monitoring the data operation signal for the memory. Then, when a new data migration start instruction is received, the monitoring operation is restarted. Through the foregoing steps, energy consumption of the monitoring device can be reduced.

In some example implementations, the data migration monitoring method described in Embodiment 1 may be applied to a data backup process and a restoration process of a memory built-in self-test (MBIST) technology. It may be understood that both the data backup process and the restoration process may be considered as a data migration process. For example, the monitoring device may monitor a data operation for a tested storage area in a process of backing up data of the tested storage area to a backup storage area related to the MBIST technology. When detecting that there is a data rewrite operation for the tested storage area, the monitoring device stops data backup, and determines that the current data backup fails. If all the data in the tested storage area is migrated to the backup storage area, and the monitoring device detects no data rewrite operation for the tested storage area, it may be determined that the data migration succeeds. Similarly, the monitoring device may repeatedly perform the foregoing monitoring operation in a process of restoring data in the backup storage area to the tested storage area. For a specific data migration monitoring process, refer to the monitoring process described in step S101 and step S102. By applying the data migration monitoring method to the data backup process and the data restoration process between the tested storage area and the backup area related to the memory built-in self-test technology, a quantity of invalid data migration operations caused by a data migration failure in the data backup process and the data restoration process can be reduced. This improves efficiency and reliability of the MBIST technology.

In embodiments of this application, the data operation for the memory is monitored in real time, so that a data migration failure caused by the data rewrite operation for the first storage area may be determined in an accurately and in time, and a quantity of invalid data operations caused by the data migration failure can be reduced. In this way, efficiency, accuracy, and applicability of a data migration process can be improved.

Figure 6:
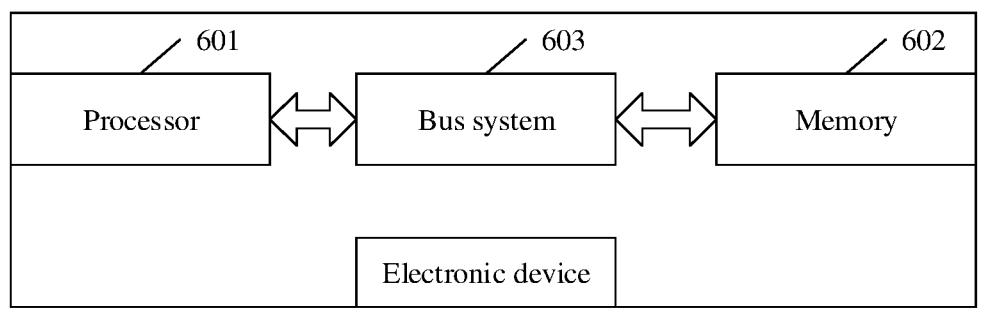
FIG. 6 is a schematic structural diagram of an electronic device according to an embodiment of this application.

FIG. 6 is a schematic structural diagram of an electronic device according to an embodiment of this application. The electronic device provided in this embodiment includes a processor 601, a memory 602, and a bus system 603. The processor 601 and the memory 602 are connected through the bus system 603.

The memory 602 is configured to store a program. Specifically, the program may include program code, and the program code includes computer operation instructions. The memory 602 includes but is not limited to a random access memory (RAM), a read-only memory (ROM), an erasable programmable read-only memory (EPROM), or a compact disc read-only memory (CD-ROM). Only one memory is shown in FIG. 6. Certainly, a plurality of memories may alternatively be disposed as required.

The memory 602 may alternatively be a memory in the processor 601. This is not limited herein.

The memory 602 stores the following elements: an executable module or a data structure, a subset thereof, or an extended set thereof:

one or more operation instructions that include various operation instructions and is used to implement various operations; and an operating system that includes various system programs and is used to implement various basic services and process one or more hardware-based tasks.

The processor 601 controls an operation of the electronic device, and the processor 601 may be one or more central processing units (CPU). When the processor 601 is one CPU, the CPU may be a single-core CPU or may be a multi-core CPU.

During specific application, components of the electronic device are coupled together through the bus system 603. In addition to a data bus, the bus system 603 may further include a power bus, a control bus, a status signal bus, and the like. However, for clear description, various buses in FIG. 6 are all marked as the bus system 603. For ease of illustration, FIG. 6 merely shows an example of the bus system 603.

The data migration monitoring method disclosed in the embodiments of this application may be applied to the processor 601, or implemented by the processor 601. The processor 601 may be an integrated circuit chip, and has a signal processing capability.

An embodiment of this application provides a computer-readable storage medium. The computer-readable storage medium stores instructions. When the instructions are run on a computer, the data migration monitoring method described in Embodiment 2 may be implemented.

The computer-readable storage medium may be an internal storage unit of the monitoring device according to Embodiment 2. The computer-readable storage medium may alternatively be an external storage device of the monitoring device, for example, a removable hard disk, a smart media card (SMC), a secure digital (SD) card, a flash card, or the like that is provided on the monitoring device. Further, the computer-readable storage medium may alternatively include both an internal storage unit and an external storage device of the foregoing monitoring device. The computer-readable storage medium is configured to store the foregoing computer program and other programs and data that are required by the foregoing monitoring device. The computer-readable storage medium may be further configured to temporarily store data that has been output or is to be output.

A person of ordinary skill in the art may understand that all or some of the procedures in the methods in the foregoing embodiments may be implemented by a computer program instructing related hardware. The program may be stored in a computer-readable storage medium. When the program is run, the procedures of the methods in the foregoing embodiments are performed. The foregoing storage medium includes any medium that can store program code, such as a ROM, a random access memory (RAM), a magnetic disk, or an optical disc.

The foregoing descriptions are merely non-limiting examples of specific implementations and are not intended to limit the protection scope, which is intended to cover variation or replacement readily determined by a person of ordinary skill in the art. Therefore, the claims shall define the protection scope.

What is claimed is:

1. A storage controller coupled to a memory, comprising:
    a data migration circuit, wherein the memory comprises a first storage area and a second storage area, the data migration circuit is configured to generate a migration signal, and data in the first storage area is migrated to the second storage area using the migration signal; and
    a data operation determining circuit, configured to:
        receive and monitor a data operation signal input to the memory in a data migration process in which the data migration circuit migrates all the data in the first storage area to the second storage area;
        detect whether the data operation signal is a data modify signal with respect to the first storage area in the data migration process; and
        output a data migration failure signal upon detecting that the data operation signal is a data modify signal with respect to the first storage area in the data migration process.

2. The storage controller of claim 1, wherein the data operation determining circuit is further configured to:
    output a data migration success signal upon determining that the data modify signal with respect to the first storage area is not detected in the data migration process.

3. The storage controller of claim 2, further comprising:
    an address switching circuit, configured to switch a data storage address of the first storage area, to which the data operation signal points, to a corresponding storage address in the second storage area, after the data migration success signal is detected.

4. The storage controller of claim 1, wherein the data operation determining circuit further comprises:
    an address determining circuit, configured to receive and extract a data storage address to which the data operation signal points, and determine whether the data storage address is a storage address of the first storage area; and
    an operation type determining circuit, configured to:
        extract a data operation type corresponding to the data operation signal when detecting that the address determining circuit determines that the data storage address is a storage address of the first storage area;
        determine that the data operation signal is the data modify signal with respect to the first storage area when the data operation type is data rewrite; and
        output the data migration failure signal.

5. The storage controller of claim 4, wherein the operation type determining circuit is further configured to:
    output the data migration failure signal when detecting that the data operation signal is the data modify signal with respect to the first storage area and when a response success signal corresponding to the data operation signal is received, wherein the response success signal indicates that data at the data storage address to which the data operation signal points is rewritten.

6. The storage controller of claim 4, wherein the operation type determining circuit is further configured to:
    trigger the data migration circuit to record the data storage address to which the data operation signal points when determining that the data operation signal is the data modify signal with respect to the first storage area; and
    the data migration circuit is further configured to:

remigrate from the first storage area to the second storage area, the data at the data storage address, to which the data operation signal points, after all the data in the first storage area is migrated to the second storage area.

7. The storage controller of claim 4, wherein the operation type determining circuit is further configured to:
trigger the data migration circuit to stop data migration when determining that the data operation signal is the data modify signal with respect to the first storage area.

8. A data migration monitoring method, comprising:
monitoring a data operation with respect to a memory in a process of migrating all data in a first storage area of the memory to a second storage area of the memory;
detecting whether the data operation is a data rewrite operation with respect to the first storage area; and
determining that data migration fails upon detecting that the data operation is a data rewrite operation with respect to the first storage area.

9. The method of claim 8, further comprising:
determining that the data migration succeeds upon determining that all the data in the first storage area is migrated to the second storage area and the data rewrite operation with respect to the first storage area is not detected.

10. The method of claim 9, further comprising:
upon determining that the data migration succeeds, switching a data storage address of the first storage area, to which the data operation points, to a corresponding storage address in the second storage area.

11. The method of claim 8, wherein the monitoring a data operation with respect to a memory comprises:
obtaining the data storage address to which the data operation with respect to the memory points;
obtaining an operation type corresponding to the data operation when a data storage address to which the data operation points is in the first storage area; and
determining that the data operation is the data rewrite operation with respect to the first storage area if the operation type corresponding to the data operation is data rewrite.

12. The method of claim 8, wherein the determining that data migration fails comprises:
determining that the data migration fails upon determination that the data rewrite operation with respect to the first storage area is successfully performed.

13. The method of claim 8, further comprising:
stopping the data migration when determining that the data migration fails.

14. The method of claim 8, further comprising:
recording a data storage address to which the data operation points when determining that the data operation is the data rewrite operation with respect to the first storage area; and
remigrating, from the first storage area to the second storage area, data at the storage address to which the data operation points, after all the data in the first storage area is migrated to the second storage area.

15. An electronic device, comprises:
at least one processor, and
a memory coupled to the at least one processor, configured to store at least a computer program including program instructions that, when executed by the at least one processor, cause the electronic device to perform operations comprising:
monitoring a data operation for the memory in a process of migrating all data in a first storage area of the memory to a second storage area of the memory;
detecting whether the data operation is a data rewrite operation with respect to the first storage area; and
determining that data migration fails when detecting that the data operation is a data rewrite operation with respect to the first storage area.

16. The electronic device of claim 15, wherein the operations further comprise:
determining that the data migration succeeds upon determination that all the data in the first storage area is migrated to the second storage area and the data rewrite operation with respect to the first storage area is not detected; and
switching a data storage address of the first storage area, to which the data operation points, to a corresponding storage address in the second storage area.

17. The electronic device of claim 15, wherein the monitoring a data operation with respect to the memory comprises:
obtaining a data storage address to which the data operation with respect to the memory points;
obtaining an operation type corresponding to the data operation when the data storage address to which the data operation points is in the first storage area; and
determining that the data operation is the data rewrite operation with respect to the first storage area when the operation type corresponding to the data operation is data rewrite.

18. The electronic device of claim 15, wherein the determining that data migration fails comprises:
determining that the data migration fails upon determination that the data rewrite operation with respect to the first storage area is successfully performed.

19. The electronic device of claim 15, wherein the operations further comprise:
stopping the data migration when determining that the data migration fails.

20. The electronic device of claim 15, wherein the operations further comprise:
recording a data storage address to which the data operation points when determining that the data operation is the data rewrite operation with respect to the first storage area; and
remigrating from the first storage area to the second storage area, data at the storage address to which the data operation points after all the data in the first storage area is migrated to the second storage area.

* * * * *